United States Patent Office 3,540,001
Patented Nov. 10, 1970

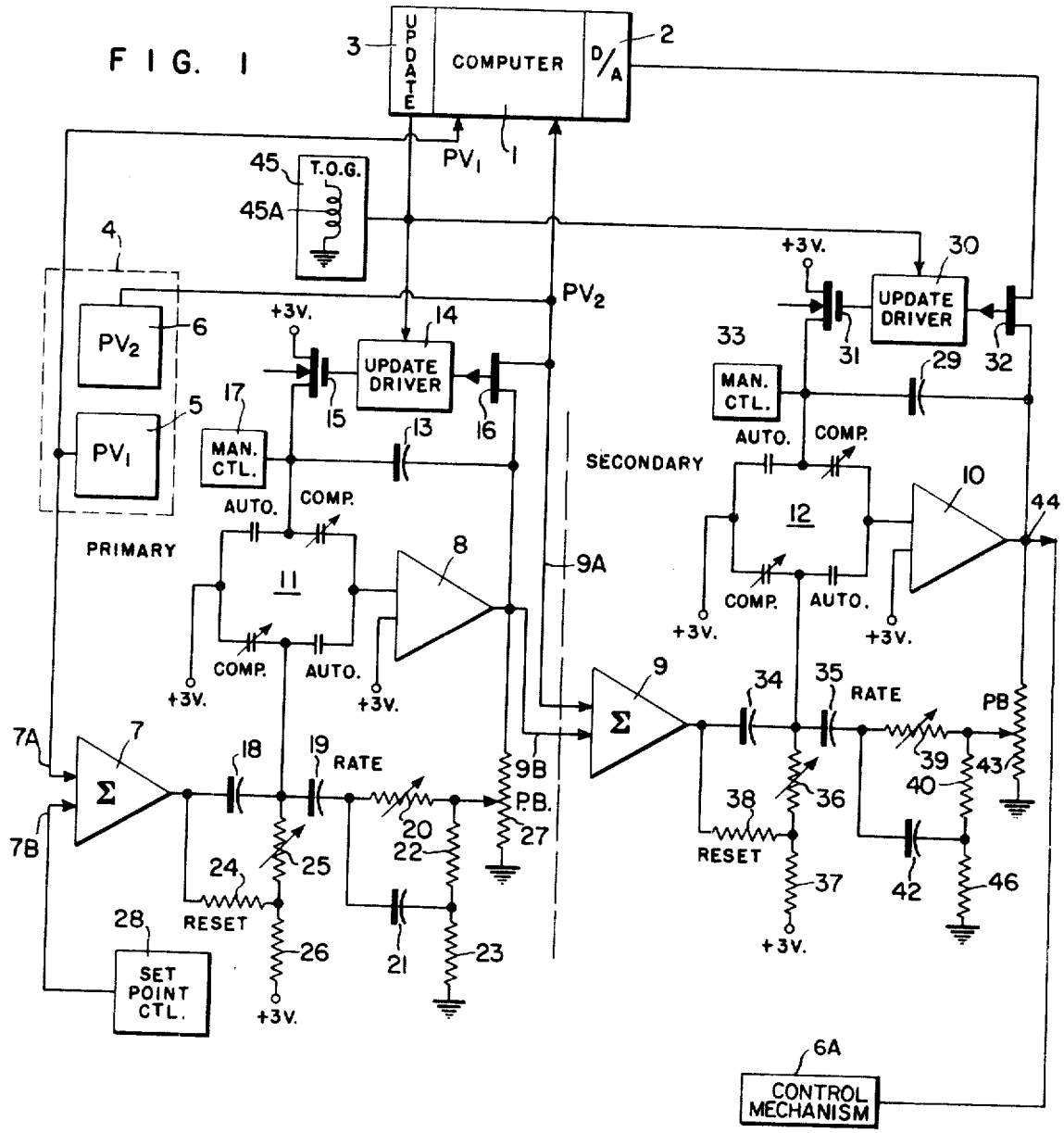

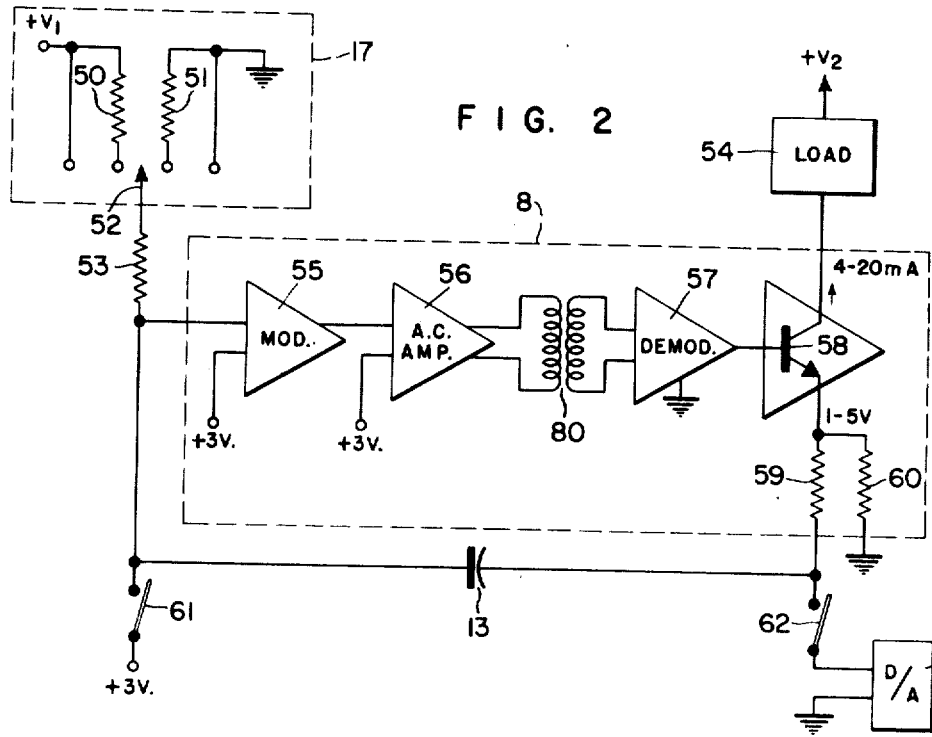
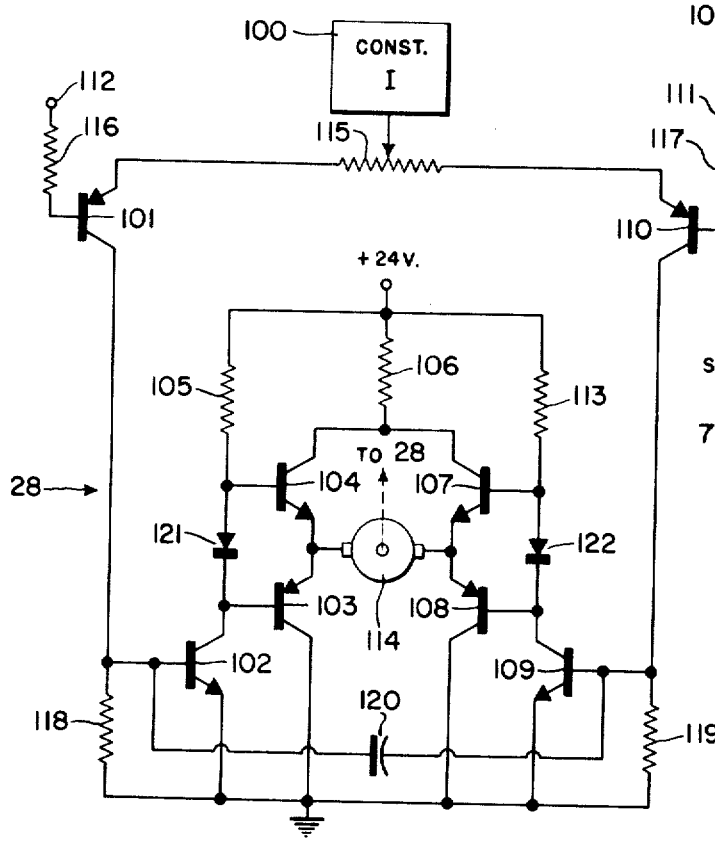
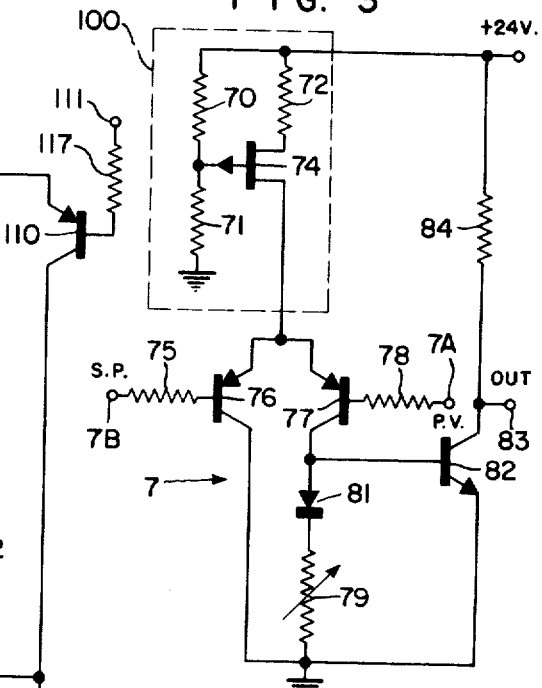

3,540,001
CONTROL CIRCUIT
Joseph Gormley, Southampton, and James A. Hogan, Hatfield, Pa., assignors to Honeywell Inc., Minneapolis, Minn., a corporation of Delaware
Filed Oct. 27, 1967, Ser. No. 678,672
Int. Cl. G05b 15/00
U.S. Cl. 340—172.5                               9 Claims

ABSTRACT OF THE DISCLOSURE

The circuit disclosed provides control means for an industrial process. The control means includes a two stage or cascaded controller network whereby a plurality of variables may be controlled. The cascaded controllers provide a back-up control for a computer which normally directs the process.

---

The subject invention relates to process control systems. More particularly, many processes in industry incorporate operations which have different rates of operation. Certain of the operations are relatively slow whereupon a second process variable is utilized to control the condition of the first process variable. This operation requires at least two controllers which are cascaded, i.e. operatively connected, to provide interrelated operation. Typically, a first controller will operate on a first process variable to provide a remote set-point for a second controller. The second controller operates to control a second process variable which directly affects the first variable.

At present, the trend in industrial process control is towards computerization. Thus, a computer will receive signals from the various process operations and produce control signals which operate upon the physical system to produce desired results. A typical type of operation is known as direct digital control (DDC). In many applications of DDC, a back-up system is used to provide system control in the event that the control computer fails or is otherwise off-line. In order to avoid "bumps" or upsets in the process operation, it is necessary that the back-up system be ready to take control of the system when the computer is inaccessible. That is, the controllers of the back-up system must provide signals which are at the same condition as existed immediately prior to the computer losing control.

The subject invention provides such a back-up system as noted. A plurality of controller stages or stations are connected in cascade to permit different rates of operation by certain process variables. These stages are connected in cascade such that the controllers are continuously updated to the computer condition whereby control of the process may be effected instantaneously and without any significant "bump" or disturbance in the process operation.

Thus, one object of this invention is to provide a back-up system for a computer controlled system.

Another object of this invention is to provide a control system comprising a plurality of cascaded control stations.

Another object of this invention is to provide a control system comprising a plurality of cascaded control stations in order to effect automatic switching from computer to back-up control smoothly.

These and other objects and advantages of this invention will become more readily apparent when the following description is read in conjunction with the attached drawings, in which:

FIG. 1 is a schematic diagram of a process control system;

FIG. 2 is a schematic diagram of the amplifiers shown in FIG. 1;

FIG. 3 is a schematic diagram, in detail, of the error amplifiers shown in FIG. 1; and FIG. 4 is a schematic diagram, in detail, of the set-point control circuit shown in FIG. 1.

Referring now to FIG. 1, there is shown a partially schematic, partially block diagram of a control system including the back-up control system. Computer 1 includes digital-to-analog converter 2 and update logic circuit 3. The configuration of the computer, digital-to-analog converter update circuitry are typical and do not form a portion of the invention, per se. A physical system 4, which represents the system controlled by computer 1, includes the controlled units 5 and 6. Units 5 and 6 provide process variables PV1 and PV2, respectively. Typically, process 4 may be a cooking process wherein the variables PV1 and PV2 represent the temperature of the material being cooked and a characteristic of a heat source, respectively. Obviously, the temperature of the material being cooked is going to vary at a much slower rate relative to the characteristic of the heat source such that PV1 will be a slowly varying signal while PV2 will be a relatively rapidly varying signal.

The signals PV1 and PV2 are supplied to the arithmetic portion of computer 1 for operation thereon. Computer 1, through its D/A 2 provides a signal to the control mechanism 6A which may, for example, be a control valve for a fuel supply to a burner unit or means for controlling the amount of electric power supplied to a heating element, either being represented by the unit 6. As noted above, the burner or heating element may supply the cooking energy to a cooker represented by the system 4. Also, as noted above, a significant parameter of the unit 6 is sensed, such as the temperature of the heater element, to produce the process variable signal PV2. The heater element, in turn, controls the temperature of primary process, e.g. the material being cooked, the latter temperature being sensed to produce the process variable signal PV1. Thus, computer control of the process is effected.

However, computer 1 will frequently be unavailable to the process. For this reason a back-up system is provided. The back-up system comprises error amplifiers 7 and 9 and control amplifiers 8 and 10. Error amplifier 7 receives the PV1 signal at input terminal 7A from process unit 5. A suitable set-point control circuit 28 provides a set-point signal at input terminal 7B of error amplifier 7.

The output of amplifier 7 is connected via resistors 24 and 26 to ground. In addition, capacitor 18 and resistor 25 are connected in series with each other and in parallel with resistor 24 to complete the RESET network. The common junction between capacitor 18 and resistor 25 is connected to capacitor 19. Capacitor 19 is further connected to ground via the series network comprising variable resistor 20 and resistors 22 and 23. Capacitor 21 is connected in parallel with resistors 20 and 22 to complete the RATE network. The common junction between resistors 20 and 22 is connected to the variable tap of variable resistor 27. Variable resistor 27 is connected between the output of amplifier 8 and ground and forms the PROPORTIONAL BAND network.

One input of amplifier 8 is connected to a suitable positive reference potential, for example +3 volts. By having a suitable positive potential, a single polarity operation is achieved. That is, the operation of the amplifiers will be in a single polarity range rather than a bipolar range such that cascade interconnection and operation is permitted. A further input of amplifier 8 is connected to one node of a switching bridge 11. The opposite node of the bridge 11 is connected to the +3 volt source. One of the intermediate nodes is connected to the junction of capacitors 18 and 19. The second intermediate node is connected, via storage capacitor 13, to the output of amplifier 8. A manual control device 17 is also connected to the last named intermediate node.

The switching bridge 11 includes, for example, four switches which operate as two ganged pairs. For example, when the input terminal of amplifier 8 is connected with the last named intermediate node, the first mentioned intermediate node is connected to the +3 volt source. The remaining pair of switches are disconnected. On the contrary, when the input terminal of amplifier 8 is connected to the first mentioned intermediate node (thereby receiving signals from the amplifier 7), the last mentioned intermediate node is connected to the +3 volt source. Thus, in the first mentioned condition, amplifier 8 is controlled by the memory capacitor 13 while in the second condition, amplifier 8 is controlled by the signals supplied by error amplifier 7.

The update circuit 3 of computer 1 is connected to an input of update driver 14 and to time-out gate 45. Update driver 14 is any suitable type of gate and is connected to the gate electrode of field-effect transistor 16 and the gate electrode of insulated gate field-effect transistor 15. FET's 15 and 16 have the drain electrodes thereof connected to opposite terminals of capacitor 13. The source electrode of FET 15 is connected to the +3 volt reference potential source while the source electrode of FET 16 is connected to process unit 6 to receive the PV2 signal. In addition, the source of FET 16 is connected to the PV input terminal 9A of error amplifier 9.

The set-point terminal 9B of amplifier 9 is connected to the output of amplifier 8. The output of amplifier 9 is connected to a computational network similar to that associated with amplifiers 7 and 8. That is, the output of amplifier 9 is connected via resistors 38 and 37 to ground while variable resistor 36 and capacitor 34 are connected in series with each other and in parallel with resistor 38. The common junction between capacitor 34 and resistor 36 is connected to capacitor 35. Capacitor 35 is further connected to ground via variable resistor 39, and resistors 40 and 46. Capacitor 42 is connected in parallel with variable resistor 39 and resistor 40. The common junction between resistors 39 and 40 is connected to the variable tap of variable resistor 43. Variable resistor 43 is connected between ground and the output of amplifier 10.

One input of amplifier 10 is connected to the +3 volt reference potential source. Another input of amplifier 10 is connected to switching bridge 12. Again, switching bridge 12 comprises four switches connected in two ganged pairs. The input of amplifier 10 is connected via one switch to the common junction between capacitors 34 and 35 via another switch to capacitor 29. The +3 volt reference potential, is connected via a third switch to the common junction of capacitors 34 and 35 and, via a fourth switch to capacitor 29. The first and fourth mentioned switches comprise one ganged pair while the second and third mentioned switches comprise another ganged pair. Capacitor 29 is connected between the switches, as noted, and the output terminal of amplifier 10. A manual control circuit 33 is connected to the common junction of capacitor 29 and switching bridge 12.

Update driver 30 is connected to update circuitry 3 of computer 1. The gate electrodes of FET's 31 and 32 are connected to the update driver 30 to receive signals therefrom. The drain electrodes of FET's 31 and 32 are, respectively, connected to opposite sides of capacitor 29. The source electrode of FET 31 is connected to the +3 volt source while the source electrode of FET 32 is connected to the D/A 2 of computer 1. Output terminal 44 is connected to the output of amplifier 10.

Initially, the system is assumed to be operating in the computer mode. Thus, the switches of switching bridges 11 and 12 labeled COMP are in the closed position, as shown. Consequently, the outputs of amplifiers 7 and 9 are, effectively, connected to the +3 volt source via the associated capacitor and are decoupled from amplifiers 8 and 10, respectively. In addition, amplifier 8 is connected to associated storage capacitor 13 while amplifier 10 is connected with the associated storage capacitor 29.

In the computer mode of operation, the input signals PV1 and PV2 are applied to computer 1. The computer operates thereupon and produces output signals to control the system. Computer 1 produces a signal from the update circuitry 3 which signal is applied to update drivers 14 and 30. This signal is operative to cause update driver 14 and 30 to produce signals at the gate electrodes of FET's 15, 16, 31 and 32 such that the FET's are conductive. Thus, the output signal produced by D/A 2 is conducted by FET 32 to storage capacitor 29. Capacitor 29 is charged to the appropriate level to represent the input signal supplied by D/A 2. The storage operation is determined by the duration of the update signal. When the update signal ceases, update drivers 14 and 30 terminate the enabling signals which are applied to the FET's. The signal stored in capacitor 29 during the update operation is applied by the COMP switch of bridge 12 to the associated input of amplifier 10. Amplifier 10 operates on the input signal and produces an output signal at terminal 44.

The output signal at terminal 44 is applied to element 6 to provide a control function thereto. For example, control element 6 may include a valve or the like which is utilized to control the output signal PV2. The signal provided by amplifier 10 will cause a suitable action at the valve.

During the previously noted update time period, the signal PV2 is applied, via FET 16 which has been enabled, to storage capacitor 13. At the termination of the update period, the signal PV2 which was stored in capacitor 13, is applied via the COMP switch to an input of amplifier 8. Amplifier 8 operates upon this input signal and produces an output signal at terminal 9B which is a function of the PV2 input signal. The signal at terminal 9B operates as the set-point signal for error amplifier 9. Thus, the set-point of amplifier 9 may be considered as tracking the PV2. Consequently, when the PV2 signal is supplied at terminal 9A it is effectively compared with the set-point signal at terminal 9B and an error signal generated. The error signal is applied to the computational networks associated with amplifier 10. Inasmuch as the COMP switch in bridge 12 is shorted, since the system is operating in the computer mode, capacitor 34 stores the error signal, if any.

In addition, error amplifier 7 receives a set-point signal at terminal 7B from the set-point control circuit 28. The PV1 signal is supplied at input terminal 7A of amplifier 7. Amplifier 7 effectively compares these signals and may produce an error signal. This error signal, if any, is stored in capacitor 18.

Thus, it is seen that computer 1, via the D/A converter 2, produces a signal at the input of amplifier 10 while the system is in computer operation. Amplifier 10 operates on this signal to produce a control function. Additionally, amplifier 7 operates upon the PV1 signal at terminal 7A as a function of the set-point signal applied at terminal 7B. Any error signal supplied by error amplifier 7 is stored in capacitor 18, whereby PV1 is effectively tracked. That is, capacitor 18 stores the error signal such that automatic, bumpless, backup control can be effected. Concurrently, the PV2 signal is supplied to amplifier 8 via storage capacitor 13. Amplifier 8 operates upon the PV2 signal and produces an output signal in accordance therewith. This signal is supplied at terminal 9B and functions as the remote set-point for secondary control station whereby the PV2 signal is effectively tracked. Therefore the process variables are tracked and the back-up system is prepared for immediate assumption of control.

Typically, computer 1 may go off-line for any number of reasons, as for example, a failure therein. A failure by computer 1 will cause update circuitry 3 to fail to produce update signals. A lack of update signals causes time-out gate 45 to produce a signal at coil 45A associated therewith. Coil 45A is related to the contacts of switching bridges 11 and 12. Of course, a separate time-out gate may be utilized for each of the switching bridges if so desired. Coil 45A operates to change the conditions of the switches. Thus, the COMP switches (shown normally closed) are switched to the open condition and the AUTO switches (shown normally open) are switched to the closed position. Thus, the input terminals of amplifiers 8 and 10 are decoupled from the storage capacitors 13 and 29, respectively and the capacitors are connected to the +3 volt reference. Concurrently, the inputs of amplifiers 8 and 10 are connected to the back-up storage capacitors 18 and 34, respectively, while these capacitors are decoupled from the +3 volt reference source.

Upon switch-over from computer to back-up or automatic control, the signals, if any, stored in automatic control capacitors 18 and 34 are applied to the inputs of amplifiers 8 and 10, respectively. Particularly, error amplifier 9 should produce no error output signals inasmuch as the signals at input terminal 9A and 9B should be substantially identical. Of course, if any system change occurs during the time between computer failure and operation of time-out gate 45, a small error may be involved. However, this error may be minimized by proper design of the time-out gate and the time duration thereof. That is, if the process under control can vary rapidly, a very short time-out period can be assigned. If the process is a slowly varying type, a relatively long timeout period can be assigned.

In the automatic control, amplifier 10 is, effectively, supplied by an input signal via storage (or computing) capacitor 34 and operates thereupon. Similarly, amplifier 8 is supplied by and operates upon a signal which is, effectively, supplied by storage capacitor 18.

Amplifier 10 provides an output signal at terminal 44 which, in effect, controls the variable PV2. Amplifier 10 previously received information from D/A converter 2 of computer 1 in the computer mode. The output signal at terminal 44 is applied to a control mechanism 6A, as hereinbefore discussed, associated with control unit 6. This signal is a function of the input variables PV1 and PV2. At the same time, the output signal PV2 produced by control unit 6 is applied to amplifier 9 via input terminal 9A and via amplifier 8 to input terminal 9B. Consequently, these signals should be substantially identical such that an error signal produced by amplifier 9 should be substantially zero. When switch-over from computer to automatic control occurs, substantially no signal is applied by capacitor 34 wherein amplifier 10 remains substantially inoperative and the control device connected to output terminal 44 is not affected. Consequently, control unit 6 remains in substantially the same condition and no upset in the system is detected.

Likewise, in computer control, by means of a signal supplied at terminal 44 the output signal PV1 of control unit 5 is maintained substantially at the predetermined set-point. Consequently, the signals at 7A and 7B are substantially constant wherein no error signal is stored in capacitor 18. Thus, amplifier 8 receives substantially no signal and is not caused to change its condition. Therefore, the remote signal supplied to terminal 9B remains substantially constant.

Once the automatic back-up control has taken control, the PV2 signal is supplied directly to terminal 9A of amplifier 9 and the remote set-point is supplied to terminal 9B via amplifier 8. However, amplifier 8 is now controlled by the output signal generated by error amplifier 7 as produced across storage capacitor 18. Likewise, amplifier 10 receives its input signal from storage capacitor 34 of error amplifier 9. Thus, it is seen that error amplifier 7 detects any error in the output signal PV1 and causes the appropriate change in the output of amplifier 8. The change in the output of amplifier 8 is applied to error amplifier 9 such that any error detected thereby is applied to amplifier 10 and produces a control signal thereat. This control signal is supplied to control unit 6 to vary the PV2 signal until the system is brought under control once again.

Referring to FIG. 2, there is shown a more detailed description of either of amplifiers 8 or 10. These amplifiers are described in more detail in the co-pending application of Hogan, Newbold, and Spady entitled Computer/Manual Stations bearing Ser. No. 647,829 and filed on June 21, 1967 and assigned to a common assignee. A detailed description of the circuit is, therefore, not deemed necessary. However, amplifier 8, as shown enclosed in dashed line, includes modulator 55, A.C. amplifier 56 and demodulator 57. Demodulator 55 operates on a D.C. input signal and produces an equivalent A.C. signal. By operating on an A.C. signal, D.C. stability is enhanced. Modulator 55 is direct coupled to an input of A.C. amplifier 56 while the A.C. amplifier is coupled via transformer 80 to demodulator 57. A.C. amplifier 56 provides high gain for the operational amplifier 8. The modulator and the A.C. amplifier are connected to +3 volt reference potential sources. By supplying a positive reference potential, the circuit is enabled to operate with a single polarity, for example positive, with respect zero. Thus, only a single, shared source is required in the circuit.

Demodulator 57 converts the A.C. signal to a D.C. signal and is direct coupled to the base of transistor 58 which repersents a voltage-to-current converter. The collector of transistor 58 is connected through a suitable load 54 to a +V2 source. The emitter of transistor 58 is connected via resistor 60 to ground and via resistor 59 to storage capacitor 13. The resistors 59 and 60 are utilized to provide bias potentials for the transistor 58. Typically, the voltage-to-current converter 58 will operate on an input signal of one to five volts supplied by D/A converter 2 via switch 62 and provide a 4–20 milliampere output current to load 54.

The input signal supplied by D/A converter 2 is supplied to capacitor 13 when switches 61 and 62 are closed. Switch 62 connects D/A 2 to the common junction between storage capacitor 13 and resistor 59 while switch 61 connects the common junction between capacitor 13 and the input of modulator 55 to the +3 volt reference source.

Manual control 17 is also supplied wherein additional input information may be supplied manually. Manual control 17 includes a push-button switch 17A. Switch 17A includes four terminals. Resistors 50 and 51 are connected between ground and a suitable potential source +V1 and separate terminals of switch 17A respectively. In addition, further terminals of switch 17A are connected directly to the +V1 source and ground respectively. The armature of switch 17A is connected via resistor 53 to the input of modulator 55. When not operative, the armature of switch 17A does not contact any terminal of switch 17A. By selective operation of switch 17A, various input signals can be achieved.

Referring now to FIG. 3, there is shown a schematic diagram of error amplifier 7 or 9 shown in FIG. 1. The error amplifier includes transistors 76 and 77 connected in differential configuration. The emitters of transistors 76 and 77 are connected together and to a substantially constant current source 100. The base of transistor 76 is connected via resistor 75 to terminal 7B to which the set-point signal is supplied. The base of transistor 77 is connected via resistor 78 to terminal 7A to which the PV signal is supplied. The collector of transistor 76 is connected directly to ground. The collector of transistor 77 is connected to ground via diode 81 and variable resistor 79. In addition, the collector of transistor 77 is connected to the base of transistor 82. The emitter of transistor 82 is connected to ground. The collector of transistor 82 is connected via resistor 84 to a +24 volt source and, as well, to output terminal 83.

The differential pair operates in the standard manner whereby signals supplied at terminals 7A and 7B are effectively compared and one of the transistors is turned on and the other is turned off, relatively. Amplifier 82 provides amplification of the signal. Diode 81 provides temperture compensation for the base-emitter characteristic of transistor 82. Diode 81, in most cases, should be a germanium diode in order to avoid an ambiguity which could occur if the voltage drop thereacross were substantially similar to that at the base-emitter junction of transistor 82. Resistor 79 is utilized to provide an output signal of +3 volts when the set-point and PV signals supplied at terminals 7B and 7A, respectively, are equal. Moreover, by placing the balancing resistor in the collector circuit of transistor 77, better gain characteristics are achieved.

The constant current source 100 includes FET 74. The source electrode is connected via resistor 72 to a +24 volt source. The drain electrode is connected to the emitters of transistors 76 and 77. A voltage divider network comprising resistors 70 and 71 is connected between the +24 volt source and ground. The gate electrode of FET 74 is connected to the common junction of resistors 70 and 71. With the constant current source configuration shown in FIG. 3, resistors 70 and 72 are of relatively high resistance. The relatively large resistors, in effect, flatten the V–I characteristic of the FET wherein a constant current source is provided which is more predictable from unit to unit.

Referring now to FIG. 4, there is shown, in detail, servo control circuit used which may be used to direct the operation of set-point control 28 of FIG. 1. In the servo control, D.C. motor 114 has one terminal connected to the emitters of transistors 104 and 103 and another terminal connected to the emitters of transistors 107 and 108. The collectors of transistors 104 and 107 are connected together and to a +24 volt source via resistor 106. The collectors of transistors 103 and 108 are connected together and to ground. Thus, it is seen, when operation of either of the transistor pairs 104 and 108 or 103 and 107 is effected, current flows through motor 114 and the direction of rotation is controlled.

The bases of transistors 104 and 103 are connected to the anode and cathode of diode 121, respectively. The anode of diode 121 is connected vai resistors 105 to the +24 volt source. The cathode thereof is connected to the collector of transistor 102. The emitter of transistor 102 is connected directly to ground while the base of transistor 102 is connected to ground via bias resistor 118.

A similar configuration is associated with the other current path. Namely, the bases of transistors 107 and 108 are connected to the anode and cathode of diode 122, respectively. The anode of diode 122 is connected via resistor 113 to the +24 volt source. The cathode of diode 122 is connected to the collector of transistor 109. The emitter of transistor 109 is connected directly to ground while the base thereof is connected to ground via bias resistor 119. In addition, the bases of transistors 102 and 103 are connected together via capacitor 120.

In this configuration, resistors 118 and 119 permit increased gain by the associated transistors 102 and 109. Also capacitor 120, connected to transistors 102 and 109 provides frequency rolloff. Diodes 121 and 122 are used to minimize the dead band operation of the circuit.

The bases of transistors 102 and 109 are further connected to the collector electrodes of transistors 101 and 110, respectively. The base of transistor 101 is connected via resistor 116 to terminal 112. The base of transistor 110 is connected via resistor 117 to terminal 111. The base of transistor 110 is connected via resistor 117 to terminal 111. The emitters of transistors 101 and 110 are connected to opposite ends of a variable resistor 115. The variable tap of resistor 115 is connected to a constant current source 100 similar to that shown in FIG. 3.

In operation, terminal 112 is connected to a PV signal, for example PV1, and terminal 111 is connected to the associated set-point signal, as supplied by set-point control 28 for example. The constant current is supplied to the circuit and balanced via resistor 115. When an imbalance occurs between S.P. and PV1, as supplied to the differential configuration of transistors 101 and 110, one of the transistors, for example transistor 101, becomes more conductive while the other transistor, for example transistor 110, becomes less conductive. Greater conduction by transistor 101 causes a greater voltage drop across resistor 118. A higher potential at the base of transistor 102 causes conduction thereby while for the opposite reason, transistor 109 becomes less conductive. As transistor 109 is effectively cutoff, the potential at the base of transistor 107 and transistor 108 rises to a higher value. Conversely, the potential at the base of transistors 104 and 103 is reduced. With these potential conditions, transistors 103 and 107 are turned on while transistors 104 and 108 are rendered nonconductive. Consequently, current flows from the +24 volt source via resistor 113, NPN transistor 107, motor 114 and PNP transistor 103 to ground. Of course, opposite conditions at terminals 111 and 112 will cause current to flow in motor 114 in the opposite direction whereby the opposite direction of rotation is obtained.

Motor 114 is mechanically coupled to set-point controls 28. For example, control 28 may be a variable resistor with the variable tap being driven by motor 114. Consequently, as motor 114 operates the variable tap of the set-point control 28 varies whereby the set-point voltage supplied to amplifier 7 varies. Thus, this set-point effects tracks PV1.

Thus, there is shown a preferred embodiment of a unique control system which permits cascaded control elements to operate effectively either in a computer or an automatic mode of operation and to be able to switch from one mode to another without serious system disturbances. Moreover, there is shown a control system which requires only a single shared source and, more particularly, a single shared source having the single polarity. This system permits an effective DDC program to utilize a reliable back-up control in the event of computer failure.

It is understood that those skilled in the art may devise and develop modifications to this system. For example, the polarity may be reversed, or the reference potentials may be altered. However, these or any similar modifications which fall within the inventive concepts hereinabove described are meant to be included within this description.

The embodiments of the invention in which an exclusive property or privilege is claimed are defined as follows:

1. A control system comprising
   primary control unit means,
   secondary control unit means,
   means supplying a first input signal to said primary control unit means,
   a physical system having at least two variables,
   means supplying signals indicative of a first variable of said physical system to said primary control unit means,
   said primary control unit means adapted to operate on said first input signal and on said signals indicative of said first variable of said physical system to produce an output signal,
   means for supplying said output signals from said primary control means to said secondary control unit means as an input signal thereto,
   means supplying signals indicative of a second variable of said physical system to said secondary control unit means,
   said secondary control unit means adapted to operate on said output signal from said primary control unit means and on said signals indicative of said second variable of said physical system to produce an output signal, and
   means for supplying said output signal from said secondary control unit means to said physical system to control the operation thereof.

2. The control system recited in claim 1 including computing means,
means connecting said signals indicative of said first and second variables of said physical system to said computing means, and
means for selectively supplying signals from said comuting means to said secondary control unit means whereby said computing means assumes overall control of said physical system.

3. The control system recited in claim 1 wherein each of said primary and secondary control unit means comprises first and second amplifier means, each of said first amplifier means comprising error amplifier means, said error amplifier means producing an output signal as a function of the input signal of the respective control unit means and the associated signal of the respective variable of said physical system.

4. The control system recited in claim 3 wherein each of said second amplifier means includes storage means connected in parallel therewith, and switch means for selectively connecting said storage means to an information source.

5. The control system recited in claim 4 including switching means connected to the input of said second amplifier means, said switching means alternatively connecting either the output of the associated error amplifier means or the associated storage means to said input of said second amplifier means, and control means connected to said switching means to determine the condition thereof.

6. The control system recited in claim 2 wherein said computing means is normally connected to said secondary control unit means to provide information thereto as a function of said first and second variables of said physical system, said signals indicative of second variable of said physical system normally being supplied to said primary and secondary control unit means, and control means connected to said computing means, said control means operative to disconnect said computing means from said secondary control unit means and said signals indicative of said second variable of said physical system from said primary control unit means.

7. A control system comprising
first control unit means,
second control unit means,
means supplying a first input signal to said first control unit means,
a physical system producing at least two variable signals,
means supplying a first variable signal to said first control unit means,
said first control unit means adapted to selectively operate on said first input signal and on said first variable signal to produce output signals,
means for supplying said output signals from said first control unit means to said second control unit means as an input signal thereto,
means supplying a second variable signal to said second control unit means,
said second control unit means adapted to selectively operate on said output signal from said first control unit means and on said second variable signal to produce an output signal,
means for supplying said output signal from said second control unit means to said physical system to control the operation thereof,
digital computer means,
means connecting said first and second variable signals of said physical system to said digital computer means,
means for selectively supplying signals from said digital computer means to said second control unit means whereby said digital computer means assumes overall controll of said physical system,
means for selectively connecting said first variable signal to said first control unit means,
control means connected to and operated by said digital computer means,
said control means operative to select the operation of said first and second control unit means relative to the signals which are selectively applied thereto and the selective operation thereby.

8. The control system recited in claim 1 wherein said means supplying a first input signal comprising potential source means.

9. The potential source means recited in claim 8 including impedance means, said impedance means having a variable terminal at which a variable potential is detected.

References Cited

UNITED STATES PATENTS 3,377,623    4/1968    Reut et al. _____ 340—172.5

RAULFE B. ZACHE, Primary Examiner

U.S. Cl X.R.

235—151.1